United States Patent [19]
Fahey

[11] B 3,925,494
[45] Dec. 9, 1975

[54] RUTHENIUM COMPLEXES AS CATALYSTS FOR REDUCTION OF POLYENES

[75] Inventor: Darryl R. Fahey, Bartlesville, Okla.

[73] Assignee: Phillips Petroleum Company, Bartlesville, Okla.

[22] Filed: Dec. 20, 1972

[21] Appl. No.: 316,917

[44] Published under the Trial Voluntary Protest Program on January 28, 1975 as document no. B 316,917.

Related U.S. Application Data

[62] Division of Ser. No. 140,564, May 5, 1971, abandoned.

[52] U.S. Cl. .......................... 260/666 A; 260/677 H
[51] Int. Cl.² ................................. C07C 13/00
[58] Field of Search ........ 260/666 A, 677 H, 683.9; 23/203 C

[56] References Cited
UNITED STATES PATENTS

| | | | |
|---|---|---|---|
| 3,113,986 | 12/1963 | Breslow et al. | 260/683.9 |
| 3,387,932 | 6/1968 | Pino et al. | 23/203 |
| 3,488,400 | 1/1970 | Candlin et al. | 260/677 H |
| 3,597,461 | 8/1971 | L'Eplattenier et al. | 260/429 |
| 3,607,050 | 9/1971 | Chabardes | 23/203 C |

*Primary Examiner*—Paul M. Coughlan, Jr.
*Assistant Examiner*—Veronica O'Keefe

[57] ABSTRACT

Complexes of zero-valent ruthenium and ligands suitable for the selective reduction of polyenes to monoenes are disclosed.

4 Claims, No Drawings

RUTHENIUM COMPLEXES AS CATALYSTS FOR REDUCTION OF POLYENES

This is a division of my application Ser. No. 140,564 filed May 5, 1971 now abandoned.

This invention pertains to the reduction of polyenes.

In one of its more specific aspects, this invention pertains to the use of ruthenium complexes as catalysts for reduction of polyenes.

The use of ruthenium for the preparation of cyclic alkenes, the ruthenium being in elemental form, is discussed in U.S. Pat. No. 3,391,206 to Hartog. Such reduction is nonselective in respect to reducing polyenes to monoenes. There has now been discovered a class of catalysts suitable for the selective reduction of polyenes to the monoenes. This invention provides those catalysts and the method for their use.

According to the method of this invention there are provided catalysts comprising ruthenium-ligand complexes having the general formula $Ru_p(CO)_q(L_3Z)_rH_s$ as hereinafter defined.

Also according to this invention there is provided a process for the selective reduction of a polyene in which a polyene is contacted with the aforementioned complexes under reducing conditions and recovering a monoene as the product.

The ruthenium complex of this invention comprises those complexes comprising zero-valent ruthenium and ligands in the form of soluble catalyst complexes. By "zero-valent ruthenium" is meant ruthenium which has not transferred any of its electrons in chemical bond formation.

Suitable ligands include those of the general formula $L_3Z$ wherein L can be R or RO, wherein R is alkyl, cycloalkyl, aryl or combinations thereof including aralkyl, alkaryl and the like wherein the maximum number of carbon atoms is twelve, and Z is one of phosphorous and arsenic.

Examples of suitable R groups are methyl, cyclohexyl, n-dodecyl, benzyl, p-tolyl, 3,5-dimethylphenyl, n-hexylphenyl and the like and their mixtures.

Other suitable ligands include carbon monoxide and hydrogen.

Suitable ruthenium-ligand complexes can be considered as having the general formula $Ru_p(CO)_q(L_3Z)_rH_s$ wherein L and Z are as previously defined, p has a value of from 1 to 6, q has a value from 3 to 18, r has a value of from 0 to 2 and s has a value of from 0 to 4.

Suitable ruthenium-ligand complexes include $(Ph_3P)_2(CO)_3Ru$, $[Ru(CO)_4]_3$, $Ru(CO)_5$, $H_2Ru_6(CO)_{18}$ and the like. $(Ph_3P)_2(CO)_3Ru$ can be produced by that method disclosed by J. P. Collman and W. R. Roper, J. Amer. Chem. Soc. 87, 4008 (1965). $[Ru(CO)_4]_3$ is commercially available from Strem Chemicals, Inc., Danvers, Mass. In the above formula, Ph is used to denote phenyl, $Ph_3P$ being triphenylphosphine.

The reduction reaction can be conducted in reaction media comprising organic solvents which dissolve the reactants and the catalyst but which are substantially inert under the conditions at which the reaction is conducted. Suitable solvents include benzene, toluene, cumene, isooctane, esters, ethers, ketones and alcohols. If preferred, the reaction can be conducted without employing an added solvent.

While the invention will be hereinafter illustrated in terms of the selective reduction of 1,5,9-cyclododecatriene to cyclododecene, it is to be understood that the invention is applicable to cyclic and acyclic polyenes of up to 20 carbon atoms including 1,3-cyclopentadiene, 1,3-pentadiene and 1,3,7,9-octadecatetraene.

In general the reaction is conducted by introducing the polyene into a solvent in any desired concentration and introducing the ruthenium-ligand complex thereinto in an amount within the range of about 0.00001 to about 0.5 moles of complex per mole of polyene.

The mixture is maintained at a temperature within the range of about 80° to about 180° C. and at a pressure within the range of about 1 to about 600 psig by the introduction of hydrogen, for a period up to about 48 hours. The monoene can be recovered from the reaction mixture by conventional techniques.

The method of this invention is illustrated by the reduction of 1,5,9-cyclododecatriene in benzene as the reaction medium under the conditions indicated. Results were as indicated:

| Run No. | Catalyst | Cat. Conc. Mole/Mole Reactant | Temp. Range, °C | Hydrogen Pressure, psig | Time, Min. |
|---|---|---|---|---|---|
| 1 | $(Ph_3P)_2(CO)_3Ru$ | .011 | 129–159 | 155–232 | 70 |
| 2 | $[Ru(CO)_4]_3$ | .019 | 127–145 | 178–209 | 105 |
| 3 | $[Ru(CO)_4]_3$ | .019 | 153–161 | 166–210 | 70 |

Product analysis in each of the runs was as follows:

| Run No. | Product Composition, Wt. % | | | |
|---|---|---|---|---|
| | Cyclododecane | Cyclododecene | Cyclododecadiene | Cyclododecatriene |
| 1 | 2.7 | 94.6 | 2.3 | 0.4 |
| 2 | 11.1 | 82.5 | 4.2 | 2.1 |
| 3 | 11.2 | 85.0 | 2.9 | 0.9 |

The above data illustrate the operability of the method of this invention to selectively reduce a polyene to produce a monoene, cyclododecene being oxidizable to 1,12-dodecanedioic acid, an important precursor for the formation of polyamides usable as fibers.

For comparative purposes 1,5,9-cyclododecatriene was hydrogenated under conditions comparable to those of Runs 1 through 3, the only significant dissimilar factor being that ruthenium metal deposited on carbon was employed as the catalyst, the ruthenium comprising 5 weight percent of the catalyst. The product was analyzed as containing 39.7 weight percent cyclododecane, 33.0 weight percent cyclododecene, 12.1 weight percent cyclododecadiene and 15.2 weight percent cyclododecatriene. These data, when compared with the prior runs, demonstrate that the elemental ruthenium is nonselective when employed for the reduction of polyenes.

What is claimed is:

1. A process for the partial hydrogenation of 1,5,9-cyclododecatriene to cyclododecene which comprises contacting 1,5,9-cyclododecatriene with a ruthenium-ligand complex catalyst consisting essentially of $(Ph_3P)_2(CO)_3Ru$ or $[Ru(CO)_4]_3$ under hydrogenation conditions which partially reduce 1,5,9-cyclododecatriene to cyclododecene.

2. The process of claim 1 wherein said ruthenium-ligand complex is $(Ph_3P)_2(CO)_3Ru$ and said contacting is effected in benzene as the reaction medium.

3. The process of claim 1 wherein said ruthenium-ligand complex is $[Ru(CO)_4]_3$ and said contacting is effected in benzene as the reaction medium.

4. The process of claim 1 wherein said contacting is effected in the presence of from about 0.00001 to about 0.5 moles of ruthenium-ligand complex catalyst per mole of 1,5,9-cyclododecatriene at a temperature within the range of from about 80° to 180°C, a hydrogen pressure within the range of from about 1 to about 600 psig, and a contact time of up to about 48 hours.

* * * * *